United States Patent
Zhou et al.

(10) Patent No.: US 11,710,476 B2
(45) Date of Patent: Jul. 25, 2023

(54) SYSTEM AND METHOD FOR AUTOMATIC TESTING OF CONVERSATIONAL ASSISTANCE

(71) Applicant: Robert Bosch GmbH, Stuttgart (DE)

(72) Inventors: Xiaowei Zhou, Fremont, CA (US); Pongtep Angkititrakul, Dublin, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 196 days.

(21) Appl. No.: 16/859,024

(22) Filed: Apr. 27, 2020

(65) Prior Publication Data

US 2021/0335338 A1 Oct. 28, 2021

(51) Int. Cl.
*G10L 15/01* (2013.01)
*G10L 15/26* (2006.01)
*G10L 15/30* (2013.01)

(52) U.S. Cl.
CPC .............. *G10L 15/01* (2013.01); *G10L 15/26* (2013.01); *G10L 15/30* (2013.01)

(58) Field of Classification Search
CPC .......... G10L 15/01; G10L 15/26; G10L 15/30
See application file for complete search history.

(56) References Cited

U.S. PATENT DOCUMENTS

| | | |
|---|---|---|
| 2012/0016678 A1 | 1/2012 | Gruber et al. |
| 2014/0019522 A1 | 1/2014 | Weng et al. |
| 2015/0078730 A1* | 3/2015 | Ueda ................. G11B 27/034 386/241 |
| 2015/0302002 A1 | 10/2015 | Mathias et al. |
| 2017/0069317 A1* | 3/2017 | Kwon .................. G10L 15/285 |
| 2017/0091200 A1* | 3/2017 | El-Mankabady ...... G08B 21/02 |
| 2018/0232376 A1 | 8/2018 | Zhu et al. |
| 2018/0233137 A1* | 8/2018 | Torok ..................... G06F 3/167 |
| 2018/0329676 A1* | 11/2018 | Williams ............... G06F 3/165 |
| 2019/0012594 A1* | 1/2019 | Fukuda ................ G06N 3/0454 |
| 2019/0013038 A1* | 1/2019 | Thomson ............... G06F 40/20 |
| 2019/0035397 A1 | 1/2019 | Reily et al. |
| 2019/0343253 A1* | 11/2019 | Gharabegian .......... G10L 15/26 |
| 2020/0081939 A1* | 3/2020 | Subramaniam ... G06F 16/90332 |
| 2020/0126541 A1* | 4/2020 | Juckett ................ G06F 21/602 |
| 2020/0175961 A1* | 6/2020 | Thomson ............... G10L 15/22 |
| 2020/0196006 A1* | 6/2020 | Boudin .................. G06F 16/44 |
| 2020/0243077 A1* | 7/2020 | Rao ........................ G10L 15/12 |

OTHER PUBLICATIONS

Bohus et al., "Olympus: an open-source framework for conversational spoken language interface research", School of Computer Science, Carnegie Mellon University, 8 pages.

* cited by examiner

*Primary Examiner* — Bhavesh M Mehta
*Assistant Examiner* — Athar N Pasha
(74) *Attorney, Agent, or Firm* — Dickinson Wright PLLC

(57) ABSTRACT

A voice recognition system includes a microphone configured to receive one or more spoken dialogue commands from a user in a voice recognition session. The system also includes a processor in communication with the microphone. The processor is configured to receive one or more audio files associated with one or more audio events associated with the voice recognition system, execute the one or more audio files in a voice recognition session in an audio event, and output a log report indicating a result of the audio events with the voice recognition session.

17 Claims, 3 Drawing Sheets

SYSTEM AND METHOD FOR AUTOMATIC TESTING OF CONVERSATIONAL ASSISTANCE

TECHNICAL FIELD

The present disclosure relates to voice recognition systems, including those with conversational assistance systems.

BACKGROUND

A conversational assistant may be a voice user interface (VUI) system that receives speech audio input from a user, understands the input meaning and then generates responses to the users. Unlike a graphical user interface (GUI) based system, how a VUI can be tested with scalable volume of test cases for reproducible test results may be a challenging task. In traditional testing for a conversational assistant, users may need to speak directly to a conversational assistant's microphone and speak one sentence at a time. The system may make audio response and produce a system log. By recording each dialog input and output, and processing the conversational assistant log, testing engineers can analyze the test result and give the evaluation of the system performance. This type of testing may have some shortcomings. One shortcoming may be that it is resource intensive. The other shortcoming may be that it is non-repeatable. It may be time consuming for human resource intensive activity to test all the use cases for conversational assistant overall performance. Besides resources being consumed, human testing also faces the issue of reproducibility. This may be because human voice may change for same text in different speaking tones or spoken dialogue, making it hard to accomplish repetitive testing for the system.

SUMMARY

According to one embodiment, a voice recognition system includes a microphone configured to receive one or more spoken dialogue commands from a user in a voice recognition session. The system also includes a processor in communication with the microphone. The processor is configured to receive one or more audio files associated with one or more audio events associated with the voice recognition system, execute the one or more audio files in a voice recognition session in an audio event, and output a log report indicating a result of the audio events with the voice recognition session.

According to a second embodiment, a voice recognition system includes a processor communication with a microphone. The processor is configured to receive one or more audio files associated with one or more audio events associated with the voice recognition system, execute the one or more audio files in a voice recognition session in an audio event in a conversational assistant system of the voice recognition system, wherein the one or more audio files are retrieved via a socket connection from a test engine, and output a log report indicating a result of the audio events with the voice recognition session.

According to a third embodiment, a voice recognition system includes a computer readable medium storing instructions that, when executed by a processor, cause the processor to receive one or more audio files associated with one or more audio events associated with the voice recognition system, execute the one or more audio files in a voice recognition session in an audio event in a conversational assistant system of the voice recognition system, wherein the one or more audio files are retrieved via a socket connection from a test engine.

DETAILED DESCRIPTION

Figure 1:
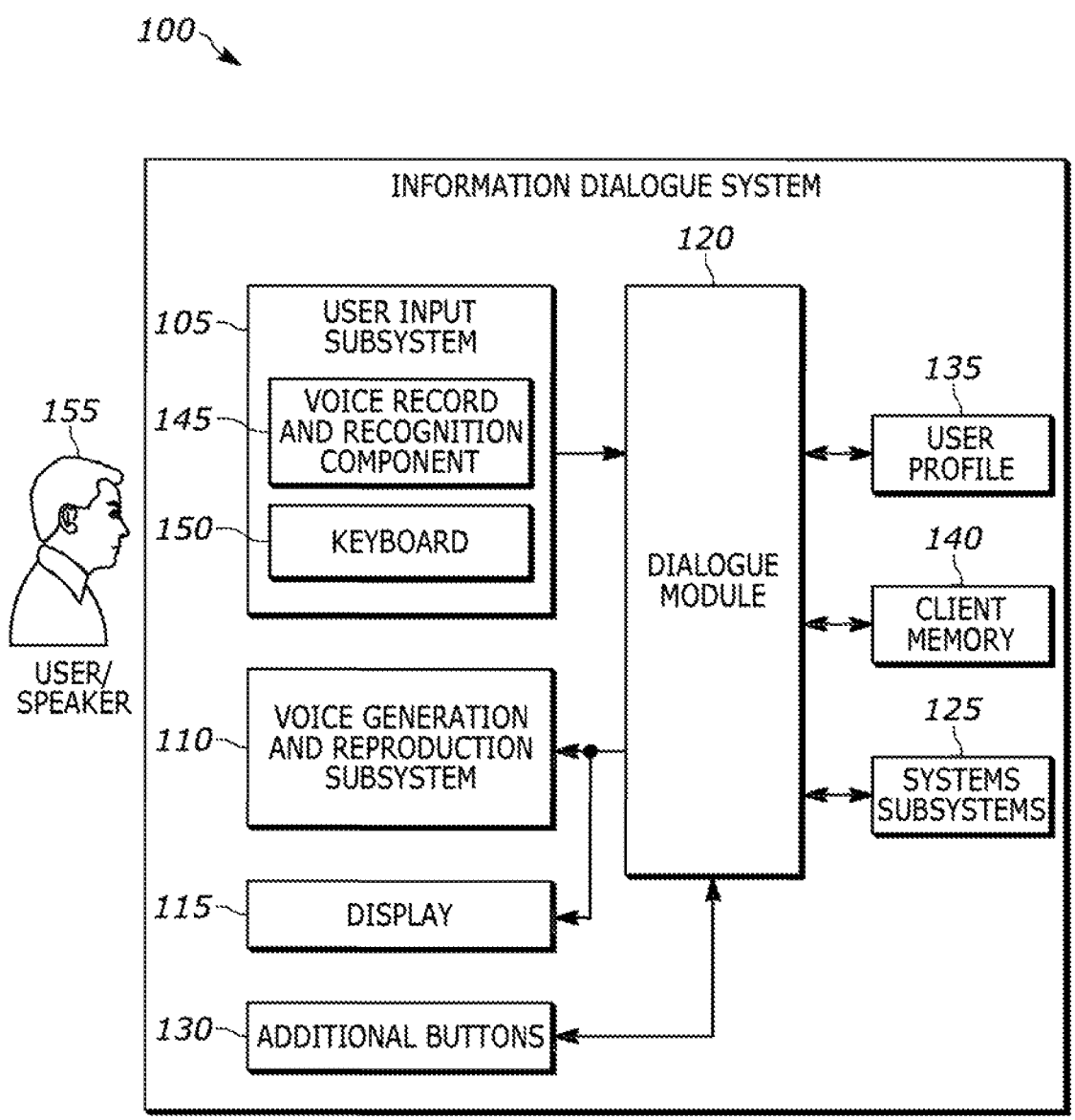
FIG. 1 shows an example of information dialogue system 100 or voice recognition system

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Features are disclosed for an architecture for automatic testing of a conversational assistant. The voice user interface (VUI) of a conversational assistant system receives speech audio input from a user, understands the input meaning, and then generates responses to the user. The architecture gives a design with scalable volume of automatic test cases for reproducible test results for the voice conversational assistant. Testing architecture may be composed by test cases and schema, an audio library, test engine, test event processor, and results analysis module. The architecture may make the conversational assistant testing repeatable and reproducible. It may reduce the resources required for repeating testing of the conversational assistant. This may also provide flexibility to design different test cases for multiple rounds of dialogue conversation.

A Conversational Assistant Automatic Testing System (CAATS) is a testing system that tests the VUI features. The testing system may provide the benefit of reliably and consistently testing voice features. This disclosure described below may include an automatic testing architecture to test the conversational assistant products. The system described below supports several testing automation features with a conversational assistant. First, the system may test systematically simulating human voice interaction with conversational assistants, hence to make the testing repeatable and reproducible. Second, the system may test the flexibility to allow testers to design different test cases for multiple rounds of dialogue between the testing module and the conversational assistant. Third, the system may test for voice interaction logging, system runtime logging, testing result recording, etc. Last, the system may include an automatic log analysis and reporting, such as a result analysis and performance analysis, and error reporting.

Referring now to the drawings, FIG. 1 shows an example of information dialogue system 100 or voice recognition system. The information dialogue system 100 may include a user input subsystem 105, a voice generation and reproduction subsystem 110, a display 115, a dialogue module 120, additional systems and/or subsystems 125, additional buttons 130, a user profile 135, and a client memory 140. The user input subsystem may include a voice record and recognition component 145 and a keyboard 150. The additional system and/or subsystems may include off-board servers or other remote services.

In an example embodiment, the keyboard 150 and the display 115 may be associated with a user device (not shown). The user device may include mobile devices, such as a laptop, a netbook, a tablet, mobile phones, smartphones, and similar devices, as well as stationary electronic devices, such as computers and similar devices. Furthermore, the voice recognition system 100 may be affiliated with a vehicle multimedia system or any other similar computing device.

The additional buttons 130 may include physical buttons of the user device and soft keys of the information dialogue system 100. For example, pressing of the "Microphone" soft key by the user may activate or disable a voice record and recognition component 145, pressing of the "Cancel" soft key may cancel the current operation performed by the information dialogue system 100, and so forth. The additional systems and/or subsystems 125 in the context of the present disclosure may include systems for working with functions of the user devices, such as a global positioning system. In addition, the voice recognition system 100 may activate a voice recognition session based on utilization of a "wake word."

The user profile 135 may include an account that contains settings, preferences, instructions, and user information. The client memory 140 may store information about a user 155 that interacts with the information dialogue system 100. The user (e.g., speaker) 155 may initiate various interaction between the components of the information dialogue system 100. For example, activation of a user input subsystem 105 based on a user request; entering of a training request by the user 155; and receiving and converting the training request of the user 155 into the text by the user input subsystem 105. Additionally, the sending of the text of the training request received as a result of conversion to a dialogue module 120, followed by processing of the received text by the dialogue module 120 and forming of a response to the training request by the dialogue module 120; sending of the response to the training request to the user 155; displaying of the response to the training request in the form of the text on a display 115; reproduction of the response to the training request in the form of a voice cue by a voice generation and reproduction subsystem 110, followed by an automatic activation of the user input subsystem 105; pressing of additional buttons 130 by the user 155 (for example, disabling the voice record and recognition component 145); performing of the actions corresponding to the additional buttons 130; interaction with additional systems and/or subsystems 125 (sending of the request to the additional systems and/or the subsystem 125 by the dialogue module 120, processing of the received request by the additional systems and/or the subsystems 125, sending of a result to the dialogue module 120); interaction with a user profile 135 (sending of the request by the dialogue module 120, receiving information from the user profile 135); and interaction with a client memory 140.

Figure 2:
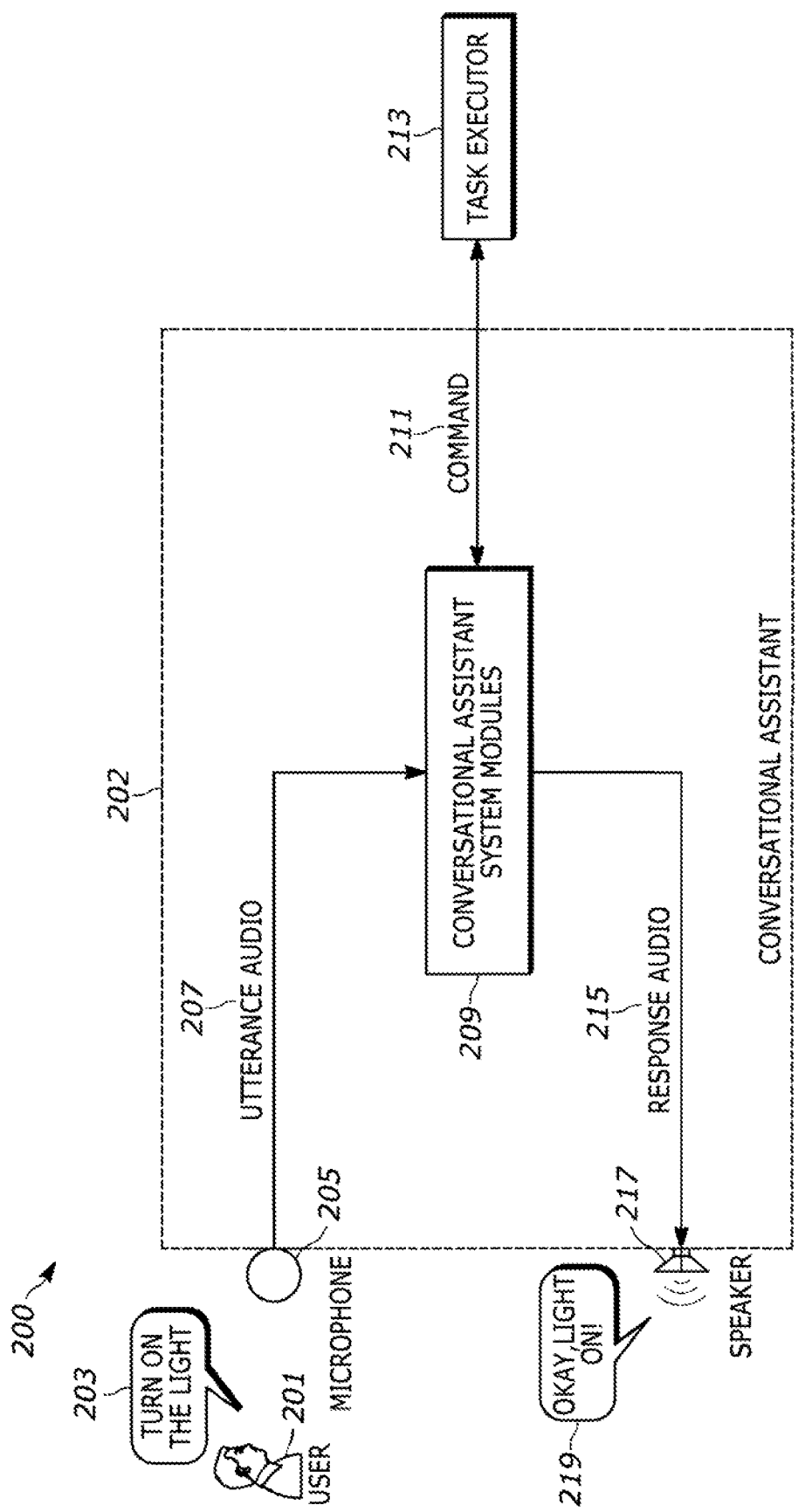
FIG. 2 illustrates a conversational assistant system according to an embodiment below.

FIG. 2 shows a system 200 that includes a conversational assistant system (CAS) 202 according to an embodiment below. The CAS 202 may include an automatic speech recognition (ASR) module that processes the user utterance audio 207 input from microphone 205. The ASR module may produce the text transcription of the utterance. The CAS 202 may include various CAS software modules 209 that are utilized to analyze the utterance audio 207. The CAS software modules may be described in more detail below, with respect to FIG. 3. At a high-level, the CAS software modules 209 may utilize the input of the utterance audio 207 to identify a command 211. The command 211 may be any type of command that the voice recognition system is capable of operating, such as turning on the lights. The CAS software module 209 may then output a response audio 215. Once processed, the software modules 209 may utilize the natural language guidance engine (NLG) to normally utilize templates to organize and produce the sentences text that system wants to reply to the user. The system may utilize the task executor 213 to provide input from the commands 211. The task executor 213 may run the task execution and collect the task result. Such examples of tasks may include to turn on the light 203, or collect weather information from internet. The response audio 215 may be an indication if the command was understood, confirmation of the activation, or further dialogue for the voice recognition session. The output audio 219 may be played out through speaker 217 by computer to user as the system voice response. In one example, the output audio 219 may include a text to speech voice reproducing the commands, such as saying "Okay, lights on!" The output audio 219 will be played out through speaker 217 by the device to the user as the system's voice response.

Figure 3:
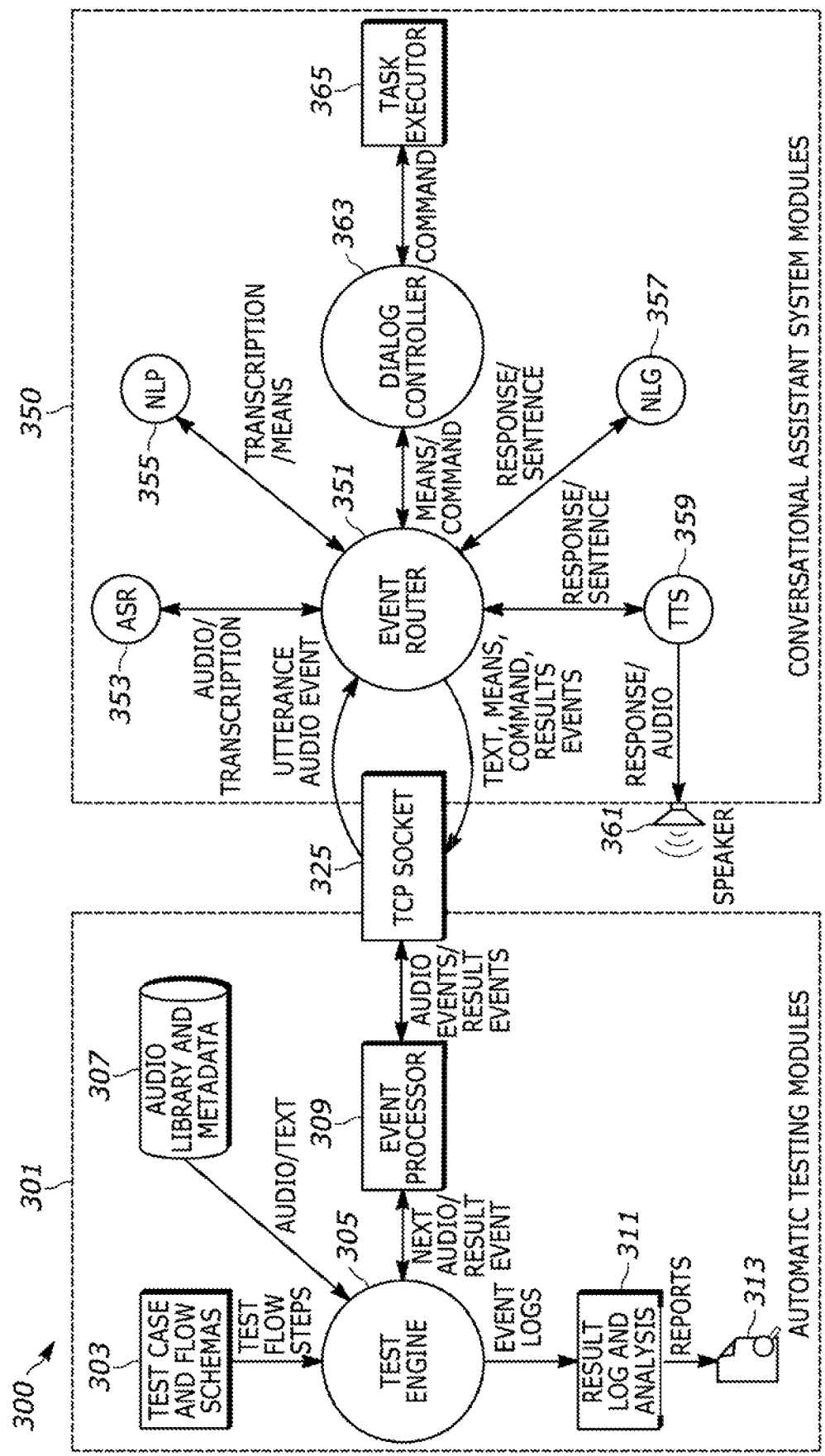
FIG. 3 illustrates a conversational assistant system that connects to a testing system via a socket connection or any other type of connection.

FIG. 3 illustrates a system 300 that incudes conversational assistant system 350 that connects to a testing system 301 via a socket connection 325 or any other type of connection. The disclosure proposes the idea and architecture to build an automatic testing system for conversational assistant. As shown in FIG. 3, the conversational assistant system 350 connects to the testing system 301 via a socket connection. The two systems communicate with each other by event messages. The conversational assistant system working in the testing mode has been illustrated in the last session. Here in this session, testing system details are given.

The testing system 301 may include a test case and schema module 303. The test case and schema module 303 may define the conversational test case in schema format. A test case may be defined as use case for one feature test, such as a user wants to get current weather information, or user wants to change the air condition temperature. Normally, one test case could have one or several audio interactions between human and device to mimic a voice recognition session. Aiming for at least one feature in one case may be a rule for almost all test cases. The test case flow and schemas 303 may be a flow chart logic to define the interaction logics between human and device for one or more test cases. For each human audio input, the conversational assistant 350 may use some logic for the use case to provide to different prompts or responses, or to ask different questions. The interactions for such a feature may follow a specific logic flow chart to work. This may defined as a case flow. The test case flow may be output into the test engine

305. The conversational assistant feature designer may understand the details of the flow request for each use case that may be evaluated.

At the testing side (e.g. testing system 301), a case flow file may be used to save a flow definition of each use case. This file may be called a called Case Flow Define file. A normal flow may contain one or many audio dialog steps, with each user input step and its device response to compose one interaction. This may be, for example, a "Set Temperature" case flow that defines what kind of step audio inputs and possible responses from the device to set a temperature. In a real talking session, the human and device will go through one or several audio dialog steps to finish one feature.

In the test case, each dialog interaction is one interaction step and a possible system response results. Each step itself may not necessarily point to an audio file, such as a WAV, MPEG3, WMA, MPEG4, FLAC, M4A, etc. Test case flow may denote the interaction logic. To create a real conversation session, the system or tester may need to map each interaction step to a real audio file. By using the test case flow, testing system defines the dialog interaction between human and conversational assistant 350. For each audio utterance input to system, the system or tester may expect one or many system results, which may be referred to as expected results. The expected results may define what kinds of device answering prompt and the other results such as sentence text, intent, and entities system detected.

When using the conversational assistant 350, the wake word may be utilized to initiate a conversation session. First, wake word, such as "Okay google" for google home device or "Alexa" for Amazon echo device, may be a word that triggers activation of the system to begin a voice recognition session. By speaking this word, the conversational assistant 350 may awake from a standby or sleep status to start a conversation with user. A testing case can use a standard wake word audio at the beginning or bypass the wake word command when running in testing mode.

When a conversation is started (e.g., a voice recognition session), this is in a conversation session with device. When a session is done, the conversational assistant will have a signal (e.g., a light blinking or a vanishing beep sound) to mark it or indicate it. During a real-world conversation, the user could talk with many possible words or commands with a conversational assistant in multiple interactions, until a conversation session end by user or by device. But in a practical testing design, normally one test use case is to test only one specific feature. Thus, to make one conversation session to test out one use case may be deemed reasonable for testing purposes. This may also help the system to evaluate the test results by one in logging analysis.

The system may also include an audio library 307. The audio library 307 may be a set of pre-recorded audio files that may also include metadata. Audio library 307 can be saved in the computer storage system in the database or file system. For each audio file 307, it may include a set of technical properties such as transcription, sampling frequency, file format like pcm or way and other technical attributes. For each audio file, audio library 307 could also have multiple attributes categorized by speaker name, gender, age, noise condition of environment, language, even speaker emotions, etc. All of the data may be utilized with the audio's transcription and its natural language processing result (intent and entities) to compose a set of data for this audio, which may be called audio metadata. Each audio file may have one metadata file in a file format such as json, csv, or other format to contain information regarding the metadata. Audio files and audio metadata could be stored in the file system or database format as an audio library 307. The audio files may be stored remotely off-line at a remote server or may be stored at the device with the voice recognition system.

The test engine 305 may be the core software or module to link the testing side components together and to run a test of the conversational assistant system 350. After reading out the test case schema 303 and audio library 307, the test engine 305 will match the test case step to the audio in the audio library 307. The test case flow may define the steps for a test case. For a testing instance of such a case, a tester may need to map an audio input step with a real audio file, which may be located in an audio library. This linking from an input step to an audio file may be referred to as "audio mapping." The Audio Mapping file may be a file linking a test flow into a real conversation instance for the test case. For a test case, by having multiple audio mapping files mapping the same set of steps to different audio files, tester can test one case by different audio files.

The test session may include a set of JSON files to define the test cases and an audio mapping file. The test case files (e.g., JSON files) may define how the test steps linked together and include what the expected text will be, intent and entities inside each step. Each test step may be just one audio input into the conversational assistant.

Audio mapping of the JSON file may define how each test step can match to one audio file in an audio library 307. The audio library 307 may be a folder with audio files and associated text. The audio mapping is to let the testing step knows where to get the right audio file for testing. The mapping may be utilized because the audio library 307 may have various audio files spoken by different people. For example, a text, e.g., "what is the weather", could have many audio files spoken by different people with different attributes (gender, dialect, tone, speed, etc.). The testing case could switch to use different audios to do testing by utilizing a different mapping file.

The test engine 305 may create a test session to run the testing for the conversational assistant. A test session may include test cases and an audio mappings collection. It may contain one or more test cases in a specified order. Each case can also refers to one audio mapping for testing. When the testing tool executes the test, it may match one case with its audio mapping and follow the flow logic to test out the audio. If one session has several cases and associated mapping files, the system will automatically test them one by one to realize the batch test in a test session.

The test session may be different from a typical conversation session. The test session may contain one or more conversation sessions based on the design for test cases inside a test session. It may be better for one test session to focus on one use case, and repeat this case testing many times by using different audios (e.g., different audio files). The test engine 305 may be only able to test one test session at a time. When the test engine 305 is running one test session, the running will be called a test session instance.

Test cases, test session and audio library are separately defined in the various embodiments. This may create flexibility as to how the tester composes the testing. In theory, testers can categorize them by any variation as they want. For example, in one use case, the system may normally design one test case for it and try to put all the interaction logic in such a case. This may allow a situation to put one speaker voice into one mapping file, so the test is more meaningful with single person voice profile. There could be many other ways to conduct a conversation in a test case, which may be reflected in the audio lib files. For each talk, a tester can build a mapping file to link audios to the case. By this way, the tester can test one case many times, in many ways and utilizing different personal audios-by using many mapping files.

For one test session file, the system may put all or part of the mappings with only one use case. Thus, when the system performs the test, it will realize which case is tested and what kind of feature to test out in this particular test case. By combining the test session, test case flow file, and audio mapping file together, the system may compose one actual test. The test engine 305 may follow the test session cases and find out each test step to do additional testing. The engine may create the audio event through event processor 309 to send to the conversational assistant 350. After test engine 305 receives the result events, the test engine 305 may check which test step is next step based on the test logic condition. The system may then create a next test step audio event and send it to conversational assistant. The test engine 305 may be configured to automatically read all cases in the test session and retrieve respective audio files from library by mapping file to feed to the conversational assistant device, according the device response in each audio interaction and follow the flow logic to finish test session.

The testing event processor 309 may be an event processor at the testing system that may act as a module to convert a test step into an audio event. The testing event processor 309 may send the audio event to the CAS 350 through a socket connection 325, such as a TCP socket. At the same time, it may receive all result events from the conversational assistant 350 and pass them to test engine 305. These events can provide series information about the success or failure inside the conversational assistant, 350 and can let us know some performance information about the system. Test engine 305 will use events to evaluate the conversational assistant performance. Event processor 309 may be a bridge to let the test engine 305 run testing with the conversational assistant 350.

The socket connection 350 can be a TCP socket or any network connection. For example, the TCP socket may be one kind of the network communication layer that is utilized to connect the testing module with the conversational assistant system 350. The socket connection 325 can be any other protocol, such as HTTP web service (SOAP, Restful), GRPC, RPC, etc. The connection may be utilized to ensure testing modeling can inject audio and get result from conversational assistant system 350 side.

Every time a test session has run, the testing system may save all the event logs 311 in a log folder. The log 311 may include the individual test and results, which may be later analyzed to create a report 313. Each event could either test the system's input audio event or one of the conversational assistant response results events. When the event is the audio content of the input or response, binary version audio data may also be logged in event format for playback in future. To evaluate one dialog for a use case test to determine whether it is successful or not, there may be several data testers that can be checked in the event of the conversational assistant results, such as transcription for the user utterance, the intent and entities extracted from transcription by NLP, system 355 response utterance text and its code.

By comparing the expected results of the testing audio and the real results received from the conversational assistant, the testing performance can be analyzed and report 313 can be produced. Thus, the log report 313 may indicate the results of the testing audio. Some criteria that may be used in the result evaluation (e.g., log report) include word error rate and sentence accuracy rate for ASR; error rate and a score for intent and entities for natural language processing 355 (NLP); and task completion rate for use cases.

When a conversational assistant works in the testing mode, it may receive audio inputs through a non-microphone-input module. The non-microphone input module may open a network connection, such as a Transmission Control Protocol (TCP) connection, to receive events through a network socket 325. To support the automation testing, the conversational assistant opens a socket (e.g., TCP socket) to receive the event of audio as an input to replace the human voice input through microphone. Event router module 351 may be a center to convert the audio event to the audio stream feeding to the ASR module 353. Event router 351 may be a center to collect and synchronize each module or engine for their processing results. When each module finishes the process, the module or engine may pass a copy of result back to the event router 351 to forward to the testing engine 305 through a socket 325. Subsequently, the tester can collect the result and produce the report 313 of testing.

One of the last steps may be to generate a response sentence from text to an audio sound, which is conducted by the module of text-to-speech (TTS) 359. TTS 359 may use the speech synthesis technology to produce the simulated human voice from the text content. The TTS 359 engine may output a stream of audio or audio files. A natural language understanding (NLU) module may be utilized find out the meaning of the utterance transcription. NLU result could be the intents and entities found from the transcription and these data will be used to trigger the command of the computer system to finish the specific tasks, such as turn on the light, switch off the radio. Dialog controller 363 may run the dialog session and context control. Task executer 365 may run the task execution and collect the task result. Such examples of tasks may include to turn on the light or collect weather information from internet Whenever the system completes a task or not, the system may need to generate the responses by organizing text sentences using a software module called natural language generation (NLG) 357.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A voice recognition system, comprising:
a microphone configured to receive one or more spoken dialogue commands from a user in a voice recognition session; and
a processor in communication with the microphone, wherein the processor is configured to:
receive, via a socket connection from a remote testing system, one or more audio files including one or more audio events associated with a test engine at the remote testing system, wherein the test engine includes a conversational assistant system and is associated with the voice recognition system, wherein the audio files include a test session mimicking one or more spoken dialogue commands in the voice recognition session;
run the test session utilizing the one or more audio files at the voice recognition system; and
output a log report indicating a result of audio events of the test session, wherein the results include at least a word error rate associated with the test session.

2. The voice recognition system of claim 1, wherein the log report is sent to the remote test engine associated with the voice recognition system.

3. The voice recognition system of claim 1, wherein the socket connection includes a transmission control protocol (TCP) socket connection.

4. The voice recognition system of claim 1, wherein the one or more audio files include an audio library with additional audio files.

5. The voice recognition system of claim 1, wherein the one or more audio files include simulations of one or more spoken dialogue commands.

6. The voice recognition system of claim 1, wherein the audio file includes a JSON file.

7. The voice recognition system of claim 1, wherein the one or more audio files include associated metadata.

8. The voice recognition system of claim 1, wherein the processor is configured to receive one or more audio mapping files that link a test flow into the voice recognition session for a test case.

9. A voice recognition system, comprising:
a processor in communication with a microphone, wherein the processor is configured to:
receive, via a socket connection to a remote testing system, one or more audio files associated with one or more audio events derived from a test engine at the remote testing system, wherein the test engine includes a conversational assistant system and is associated with the voice recognition system, wherein the audio files include a test session mimicking one or more spoken dialogue commands in the voice recognition session;
run the test session utilizing the one or more audio files at the conversational assistant system of the voice recognition system, wherein the one or more audio files are retrieved via a socket connection from a test engine; and
output a log report indicating a result of audio events of the test session, wherein the results include at least one voice recognition evaluation statistic.

10. The voice recognition system of claim 9, wherein the processor is configured to output the log report after receiving the result via the socket connection.

11. The voice recognition system of claim 9, wherein the socket connection includes a transmission control protocol (TCP) socket connection.

12. The voice recognition system of claim 9, wherein the remote testing system includes an audio library with additional audio files.

13. The voice recognition system of claim 9, wherein the audio file includes a CSV file.

14. A voice recognition system comprising:
a non-transitory computer readable medium storing instruction that, when executed by a processor, cause the processor to:
receive, via a socket connection to a remote testing system, one or more audio files associated with voice commands associated with a test engine at the remote testing system, wherein the test engine includes a conversational assistant system and is associated with the voice recognition system, wherein the audio files include a test session mimicking one or more spoken dialogue commands in the voice recognition session; and
run the test session utilizing the one or more audio files at the voice recognition system.

15. The voice recognition system of claim 14, wherein the instructions further cause the processor to output a log report indicating results of audio events of the test session, wherein the results include at least a word error rate associated with the test session.

16. The voice recognition system of claim 14, wherein the one or more audio files each contain different voice commands having a different dialogue accent.

17. The voice recognition system of claim 14, wherein the non-transitory computer readable medium is further configured to store instructions that cause the processor to receive one or more audio mapping files that link a test flow into the voice recognition session for the test session.

* * * * *